United States Patent
Beckmann

(10) Patent No.: US 6,592,644 B2
(45) Date of Patent: Jul. 15, 2003

(54) SULFIDIZATION OF SULFIDE ORES FOR HYDROMETALLURGICAL EXTRACTION OF COPPER AND OTHER METALS

(76) Inventor: Alexander Beckmann, Haselnussweg 2, Wesel (DE), 46487

( * ) Notice: Subject to any disclaimer, the term of this patent is extended or adjusted under 35 U.S.C. 154(b) by 0 days.

(21) Appl. No.: 09/926,120

(22) PCT Filed: Dec. 14, 2000

(86) PCT No.: PCT/DE00/04447

§ 371 (c)(1),
(2), (4) Date: Sep. 19, 2001

(87) PCT Pub. No.: WO01/44524

PCT Pub. Date: Jun. 21, 2001

(65) Prior Publication Data

US 2002/0157504 A1 Oct. 31, 2002

(30) Foreign Application Priority Data

Dec. 14, 1999 (DE) .......................... 199 60 132

(51) Int. Cl.⁷ ................................. C22B 4/00
(52) U.S. Cl. ........................ 75/10.13; 75/10.19; 75/419
(58) Field of Search ............... 75/10.43, 421, 75/422, 423, 424, 425, 744, 743, 419, 10.13, 10.19

(56) References Cited

U.S. PATENT DOCUMENTS

| | | | | |
|---|---|---|---|---|
| 3,459,535 A | * | 8/1969 | Vizsolyi et al. | 423/48 |
| 3,985,555 A | | 10/1976 | Shirts et al. | |
| 4,177,067 A | * | 12/1979 | Pepper et al. | 423/24 |
| 5,316,567 A | * | 5/1994 | Jones | 423/24 |
| 5,611,839 A | | 3/1997 | Kohr | |
| 5,914,441 A | | 6/1999 | Hunter et al. | |
| 6,074,533 A | * | 6/2000 | Tranquilla | 204/157.15 |
| 6,168,766 B1 | * | 1/2001 | Imai et al. | 423/27 |

FOREIGN PATENT DOCUMENTS

| | | | |
|---|---|---|---|
| AU | XP-002166815 | 10/1991 | |
| DE | 1 558 425 | 10/1973 | |
| DE | 24 27 158 A | 12/1975 | |
| DE | 197 37 452 A1 | 2/1999 | |
| EP | 0 522 978 A1 | 1/1993 | |
| GB | 1467360 * | 3/1977 | ............. C22B/1/00 |
| JP | XP-002166816 | 4/1974 | |
| WO | WO 96/27030 | 9/1996 | |
| WO | WO 98/39491 | 11/1998 | |
| WO | WO 98/51828 | 11/1998 | |
| WO | WO 99/36582 | 7/1999 | |
| WO | WO 00/06785 | 2/2000 | |
| WO | WO 01/44524 A1 | 6/2001 | |

OTHER PUBLICATIONS

The American Heritage Dictionary of the English Language, Third Edition. 1992. 2 pages.*

Norio Wakao et al. "Bacterial Pyrite Oxidation III. Adsorption of Thiobacillus Ferrooxidans Cells on Solid Surfaces and its Effect on Iron Release from Pyrite", J. Gen. Appl. Microbiol., 30, pp.,63–77 (1984). No month.

D.W. Duncan et al., "Leaching of Chalcopyrite with Thiobacillus Ferrooxidans: Effect of Surfactants and Shaking", American Society for Microbiology, vol. 12, No. 2, pp. 122–126, (1964). Mar.

Corale L. Brierley, "Bacterial Oxidation", pp. 42–44, May (1995).

* cited by examiner

Primary Examiner—Melvyn Andrews
(74) Attorney, Agent, or Firm—Jacobson Holman PLLC

(57) ABSTRACT

The invention relates to a method for the extraction of metals from copper sulphide and/or copper iron sulphide ores with microbiological- and chemical-type leaching steps for dissolution of the metals, which comprises the following steps: 1) In a conversion step, prior to the leaching steps, the ores are converted to covellite, pyrites and admixed sulphides by the addition of sulphur, and 2) copper and other metals, noble metals and rare earths contained in the reaction product are extracted.

21 Claims, No Drawings

SULFIDIZATION OF SULFIDE ORES FOR HYDROMETALLURGICAL EXTRACTION OF COPPER AND OTHER METALS

This is a nationalization of PCT/DE00/04447, filed Dec. 14, 2000, and published in German.

The present invention relates to a process for extracting metals from a copper-sulfidic and/or copper/iron-sulfidic ore or ore concentrate.

By far the biggest part of the world's copper production (about 90%) is extracted from copper sulfide minerals. Among the copper sulfide minerals, there may be mentioned, above all, chalcopyrite ($CuFeS_2$), bornite ($Cu_5FeS_4$), cubanite ($CuFeS_4$), chalcosine ($Cu_2S$), digenite ($Cu_9S_5$), covelline (CuS), enargite ($Cu_3AsS_4$), tennantite ($Cu_{12}As_4S_{13}$) and tetrahedrite ($Cu_{12}Sb_4S_{13}$).

Among the copper sulfide minerals, chalcopyrite is the most widespread mineral; therefore, it is of the greatest scientific and economic importance in the development of new extraction methods.

In addition, chalcopyrite is characterized by always containing deposited gold, platinum metals and other rare metals as well as rare earths.

The copper sulfide minerals are extracted from ores, which are usually milled and concentrated by a flotation process to yield an ore concentrate, whereby a substantial part of the silicates contained in the ground stock, in particular, is separated off.

Today, in addition to the known pyrometallurgical and hydrometallurgical processes, there are various approaches to leaching copper and other metals occurring in the copper sulfide minerals from the ores or ore concentrates using bioleaching processes. This involves the problem that only about 20% of the copper contained in chalcopyrite can be leached out using the known processes because passivation of the chalcopyrite occurs.

Although a large number of attempts to avoid the passivation of chalcopyrite have been successfully performed on a laboratory scale, no utilizable process technology for metal extraction could be derived therefrom to date.

Thus, it has been the object of the invention to provide an improved process for extracting copper and other metals from chalcopyrite.

This object is achieved by a process in which 1. chalcopyrite is converted to covelline and pyrite by the addition of sulfur in an open process; and
2. copper and other soluble metals enriched in the covelline, pyrite and accompanying sulfides are leached out.

This conversion is represented by the following equation:

$$CuFeS_2 + S \rightarrow CuS + FeS_2 \quad (1)$$

It has been found that chalcopyrite can be converted to covelline and pyrite almost completely when the process is appropriately conducted. In this conversion, a chalcopyrite grain from the ground stock yields a grain having a core of pyrite and a shell of covelline. In contrast to chalcopyrite, from covelline, copper and the remaining metals enriched therein can be leached out with no problems using conventional leaching methods, because passivation problems do not exist in this case.

This reaction is exothermic so that a comparatively low expenditure of energy is necessary for the conversion.

A possible process for extracting copper from covelline is described by the following equation:

$$CuS + Fe_2(SO_4)_3 \rightarrow CuSO_4 + 2FeSO_4 + S \quad (2)$$

The copper sulfate produced, like the iron sulfate, is soluble in acid. Thus, iron and copper are solubilized and can be separated from the solution.

Also, the iron can be oxidized and leached out from the pyrite.

What remains is a mixture of precious and other metals and rare earths contained in the ground stock, especially of gold, silver, platinum and platinum metals, cobalt, nickel and zinc, which will deposit as a residue on the bottom of the tank in which the leaching process is performed.

With novel bioleaching processes, the copper can be leached out in a particularly environment-friendly manner and with a relatively low production of sulfuric acid.

In this process, the covelline is oxidized in accordance with $$CuS + O_2 \rightarrow CuSO_4$$

in the presence of special bacteria and separated in an aqueous solution.

The conversion of chalcopyrite should preferably proceed in an inert atmosphere, for example, under nitrogen, sulfur dioxide or argon.

A range of between room temperature and 501° C. has been established as a preferred temperature range for the conversion. Especially at 410° C., the conversion can proceed at a relatively high rate.

The conversion process of chalcopyrite to covelline can be promoted by microwave irradiation. Since the microwaves heat up the individual grains of the ground stock in both inner and outer portions thereof, the diffusion processes proceeding in the conversion during the formation of the pyrite core and the shell of covelline can be accelerated thereby. By this improvement of reaction kinetics, the open process can be accelerated, and the economic efficiency of the process can be thus increased.

Depending on the reaction temperature and the degree of any microwave irradiation, the conversion can proceed for a period of from 0.5 h to 3 h, especially 2 h. While a conversion of 80% can be achieved in 30 minutes with no problems, the chalcopyrite is almost completely converted after 3 h.

The sulfur should be added to the chalcopyrite in stoichlometric amounts.

The sulfur can be added to the ground stock in a solid form, in which case the conversion of the chalcopyrite can be effected under ambient pressure, but should preferably be performed under a pressure above atmospheric of up to 10 bar. To avoid that too much sulfur evaporates at temperatures for conversion, it may be advantageous for the conversion to proceed in an atmosphere saturated with sulfur vapor.

On the other hand, the conversion may also be effected without the addition of solid sulfur in an atmosphere containing gaseous sulfur under reduced pressure.

Conversion with the addition of a sulfur plasma is also possible.

The process can be realized in a three-chamber tunnel furnace. The three-chamber tunnel furnace has first and third chambers which serve as sluices for the second chamber. The second chamber of the furnace is provided with electric heating coils and has an inlet for nitrogen or argon. In addition, the second chamber is provided with fused silica windows for introducing microwaves.

Experiments have shown that the conversion to covelline is optimized, in particular, when the mixture of ground stock and sulfur Is irradiated with microwaves having a specific energy density of from 8 to 35 kWh/t, based on the quantity of the ground stock. Both microwaves of 815 MHz and those of 2.45 GHz can be used.

The conversion of chalcopyrite to covelline may also be effected in a fluidized bed reactor.

What is claimed is:

1. A process for extracting metals from chalcopyrite-containing ores comprising leaching steps of microbiological or chemical nature for leaching out the metals, characterized in that
   a) the ores are converted in an inert atmosphere to a reaction product comprising covelline, pyrite, and accompanying sulfides by adding sulfur and additives in a conversion step interposed prior to the leaching steps, and
   b) copper and other metals, precious metals, and rare earths contained in the reaction product are extracted.

2. The process according to claim 1, characterized in that iron is extracted from the reaction product and that metals and rare earths deposited in the reaction product are separated off.

3. The process according to claim 1, characterized in that the metals and rare earths are selected from the group consisting of gold, silver, platinum-group elements, cobalt, nickel, and zinc.

4. The process according to claim 3, characterized in that the metals are leached out using a leaching or bioleaching process, and sulfur is extracted from the covelline, pyrite, accompanying sulfides by a further process.

5. The process according to claim 1, characterized in that said conversion is performed in a rotary-tube furnace.

6. The process according to claim 1, characterized in that said conversion is performed at a temperature of between room temperature and 501° C.

7. The process according to claim characterized in that said conversion is performed data temperature at 410° C.

8. The process according to claim 1, characterized in that said conversion is promoted by microwave irradiation.

9. The process according to claim 1, characterized in that said conversion is effected for a period of from 0.5 h to 24 h.

10. The process according to claim 1, characterized in that said conversion is effected for a period of 2 h.

11. The process according to claim characterized in that sulfur is added in stoichiometric amounts.

12. The process according to claim 1, characterized in that sulfur is added in a solid state and the conversion is effected under a pressure of up to 10 bar.

13. The process according to claim 11, characterized in that said conversion proceeds in an atmosphere saturated with sulfur vapor.

14. The process according to claim 1, characterized in that sulfur is added in a gaseous state and the conversion is effected under reduced pressure.

15. The process according to claim 1, characterized in that the conversion is effected with a sulfur plasma.

16. A process for extracting metals from chalcopyrite-containing ores comprising leaching steps of microbiological or chemical nature for leaching out the metals, characterized in that
   the ores are converted in a rotary-tube furnace to a reaction product comprising covelline, pyrite, and accompanying sulfides by adding sulfur and additives in a conversion step interposed prior to the leaching steps, and
   copper and other metals, precious metals and rare earths contained in the reaction product are extracted.

17. A process for extracting metals from chalcopyrite-containing ores comprising leaching steps of microbiological or chemical nature for leaching out the metals, characterized in that
   the ores are converted to a reaction product comprising covelline, pyrite, and accompanying sulfides by adding sulfur and additives in a conversion step, promoted by microwave irradiation, interposed prior to the leaching steps, and
   copper and other metals, precious metals and rare earths contained in the reaction product are extracted.

18. A process for extracting metals from chalcopyrite-containing ores comprising leaching steps of microbiological or chemical nature for leaching out the metals, characterized in that
   the ores are converted to a reaction product comprising covelline, pyrite, and accompanying sulfides by adding sulfur in a solid state and additives in a conversion step effected under a pressure of up to 10 bar interposed prior to the leaching steps, and
   copper and other metals, precious metals and rare earths contained in the reaction product are extracted.

19. A process for extracting metals from chalcopyrite-containing ores comprising leaching steps of microbiological or chemical nature for leaching out the metals, characterized in that
   the ores are converted in to a reaction product comprising covelline, pyrite, and accompanying sulfides by adding sulfur in stoichiometric amounts and additives in a conversion step that proceeds in an atmosphere saturated with sulfur vapor interposed prior to the leaching steps, and
   copper and other metals, precious metals and rare earths contained in the reaction product are extracted.

20. A process for extracting metals from chalcopyrite-containing ores comprising leaching steps of microbiological or chemical nature for leaching out the metals, characterized in that
   the ores are converted in to a reaction product comprising covelline, pyrite, and accompanying sulfides by adding sulfur in a gaseous state and additives in a conversion step effected under reduced pressure interposed prior to the leaching steps, and
   copper and other metals, precious metals and rare earths contained in the reaction product are extracted.

21. A process for extracting metals from chalcopyrite-containing ores comprising leaching steps of microbiological or chemical nature for leaching out the metals, characterized in that
   the ores are converted to a reaction product comprising covelline, pyrite, and accompanying sulfides by adding sulfur and additives in a conversion step effected with a sulfur plasma interposed prior to the leaching steps, and
   copper and other metals, precious metals and rare earths contained in the reaction product are extracted.

* * * * *

(12) EX PARTE REEXAMINATION CERTIFICATE (8528th)
United States Patent
Beckmann

(10) Number: US 6,592,644 C1
(45) Certificate Issued: Sep. 13, 2011

(54) SULFIDIZATION OF SULFIDE ORES FOR HYDROMETALLURGICAL EXTRACTION OF COPPER AND OTHER METALS

(76) Inventor: Alexander Beckmann, Wesel (DE)

Reexamination Request:
No. 90/010,894, Mar. 8, 2010

Reexamination Certificate for:
Patent No.: 6,592,644
Issued: Jul. 15, 2003
Appl. No.: 09/926,120
Filed: Sep. 19, 2001

(22) PCT Filed: Dec. 14, 2000

(86) PCT No.: PCT/DE00/04447
§ 371 (c)(1),
(2), (4) Date: Sep. 19, 2001

(87) PCT Pub. No.: WO01/44524
PCT Pub. Date: Jun. 21, 2001

(30) Foreign Application Priority Data

Dec. 14, 1999 (DE) .......................................... 19960132

(51) Int. Cl.
*C22B 1/06* (2006.01)
*C22B 1/00* (2006.01)
*C22B 3/00* (2006.01)
*C22B 3/18* (2006.01)
*C22B 15/00* (2006.01)

(52) U.S. Cl. ................ 75/10.13; 75/10.19; 75/419
(58) Field of Classification Search ................ 75/10.13
See application file for complete search history.

(56) References Cited

U.S. PATENT DOCUMENTS

| | | |
|---|---|---|
| 3,459,535 A | 8/1969 | Vizsolyi et al. |
| 3,817,743 A | 6/1974 | Sardisco |
| 4,052,151 A | 10/1977 | Reichrt et al. |
| 4,255,130 A | 3/1981 | Johnson, Jr. |
| 5,490,976 A | 2/1996 | Rennie et al. |
| 5,824,133 A | 10/1998 | Tranquilla |

FOREIGN PATENT DOCUMENTS

GB 1 248 663 A 10/1971

OTHER PUBLICATIONS

Matoba, Y. et al., "Smelting Technology Handbook", 1963, pp. 415–427, Asakura Publishing Co., Ltd.

*Primary Examiner*—Stephen Stein

(57) ABSTRACT

The invention relates to a method for the extraction of metals from copper sulphide and/or copper iron sulphide ores with microbiological- and chemical-type leaching steps for dissolution of the metals, which comprises the following steps: 1) In a conversion step, prior to the the leaching steps, the ores are converted to covellite, pyrites and admixed sulphides by the addition of sulphur, and 2) copper and other metals, noble metals and rare earths contained in the reaction product are extracted.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-21 are cancelled.

* * * * *